(12) United States Patent
Kikawa et al.

(10) Patent No.: US 7,059,183 B2
(45) Date of Patent: Jun. 13, 2006

(54) AIR FLOW MEASURING DEVICE

(75) Inventors: Hiromu Kikawa, Hitachinaka (JP);
Izumi Watanabe, Hitachinaka (JP);
Shinya Igarashi, Naka-machi (JP);
Keiichi Nakada, Hitachinaka (JP); Kei Ueyama, Hitachinaka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 09/858,476

(22) Filed: May 17, 2001

(65) Prior Publication Data

US 2001/0052260 A1 Dec. 20, 2001

(30) Foreign Application Priority Data

Jun. 16, 2000 (JP) ............................ 2000-185907

(51) Int. Cl.
*G01F 1/68* (2006.01)
(52) U.S. Cl. .................. 73/202.5; 73/118.2; 73/204.21
(58) Field of Classification Search .................. 73/202, 73/204.21, 204.22, 204.16, 204.19, 118.2, 73/861.22
See application file for complete search history.

(56) References Cited

U.S. PATENT DOCUMENTS

| 4,709,581 | A | * | 12/1987 | Nishimura et al. | ............ 73/202 |
| 5,127,173 | A | * | 7/1992 | Thurston et al. | ............... 73/202 |
| 5,355,726 | A | * | 10/1994 | Zurek et al. | ................ 73/202.5 |
| 5,696,321 | A | * | 12/1997 | Igarashi et al. | ............ 73/202.5 |
| 6,332,356 | B1 | * | 12/2001 | Hecht et al. | ................ 73/202.5 |
| 6,336,360 | B1 | * | 1/2002 | Weber | ...................... 73/204.21 |
| 6,571,621 | B1 | * | 6/2003 | Watanabe et al. | .......... 73/202.5 |
| 6,647,775 | B1 | * | 11/2003 | Hecht et al. | ............... 73/202.5 |

FOREIGN PATENT DOCUMENTS

| DE | 198 15 654 A1 | 10/1999 |
| DE | 198 15 656 A1 | 10/1999 |
| JP | 56-53411 | 5/1981 |
| JP | 11-248505 | 9/1999 |
| WO | WO 99/53274 | 10/1999 |

\* cited by examiner

*Primary Examiner*—Harshad Patel
(74) *Attorney, Agent, or Firm*—Dickstein Shapiro Morin & Oshinsky LLP

(57) ABSTRACT

The present invention provides an air flow measuring device comprising a housing with a sub-passage having an inlet and an outlet for air flow formed in the housing, the sub-passage further having a predefined curvature with a maximum downstream point and a flow measuring element located in the sub-passage at a position at least further downstream from the point.

14 Claims, 7 Drawing Sheets

AIR FLOW MEASURING DEVICE

FIELD OF THE INVENTION

The present invention relates to air flow measuring devices, and particularly, to air flow measuring devices for internal combustion engines.

DISCUSSION OF THE RELATED ART

Conventional air flow measuring devices for internal combustion devices are provided with a filter element for cleaning the incoming air. However, its cleaning effect is inadequate since the dust particles or moisture contained in the intake air, often passes through the filter element reaching the air intake passage, where the air flow measuring device is located. Also, certain after market air filter products are poorer in quality as compared to the original product which further exasperates the problem. If the dust particles contained in the intake air adheres to the flow measuring element of the air flow measuring device, the characteristic heat radiation which is utilized to accurately measure the air flow can deviate, outputting inaccurate results. Also, depending on the dust particle size and speed of the particle in the incoming air flow, the flow measuring element may even be damaged. Further, if moisture, such as water, adheres to the measuring element, the element may deteriorate with time due to sudden temperature changes or provide an inaccurate output due to changes in the heat radiation rate.

SUMMARY OF THE INVENTION

The present invention provides a sub-passage that allows dust or moisture contained in the intake air, which may provide inaccurate readings by an air flow measuring element, due to contamination or break-down, to be separated by inertial force of the dust or moisture while ensuring a sufficient air flow in the area where the flow measuring element is installed.

In an object of the present invention, an air flow measuring device comprising a housing with a sub-passage having an inlet and an outlet for air flow formed in the housing is provided. The sub-passage has a predefined curvature with a maximum downstream point. Also, a flow measuring element is located in the sub-passage at a position at least further downstream from the point.

In another object of the invention, an engine comprising an engine control unit and an air flow measuring device electrically coupled to the engine control unit for measuring air flow is provided. The air flow measuring device comprises a housing with a sub-passage having an inlet and an outlet for air flow formed in the housing. The sub-passage has a predefined curvature with a maximum downstream point. Also, a flow measuring element is located in the sub-passage at a position at least further downstream from the point.

In yet another object of the invention, an air flow measuring device comprising a housing and a sub-passage formed in the housing is provided. The sub-passage has a predefined curvature with a maximum downstream point and a flow measuring element located in the sub-passage at a position at least further downstream from the point.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Figure 1:
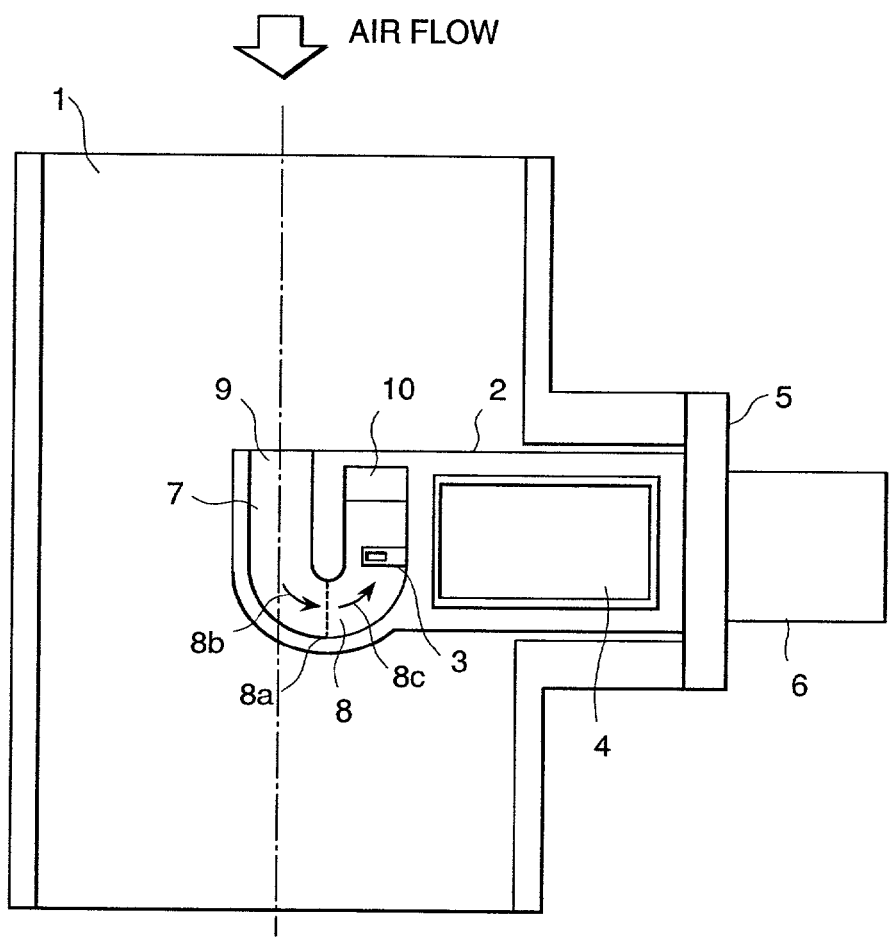
FIG. 1 illustrates a cross-sectional view of a air flow measuring device according to one embodiment of the present invention.

Exemplary embodiment of the present invention will be described below in connection with the drawings. Other embodiments may be utilized and structural or logical changes may be made without departing from the spirit or scope of the present invention. Although the invention is described in terms of an automobile component, namely, an automobile engine, the invention is applicable to other combustion engines utilizing an air flow measuring device. Like items are referred to by like reference numerals throughout the drawings.

Figure 3:
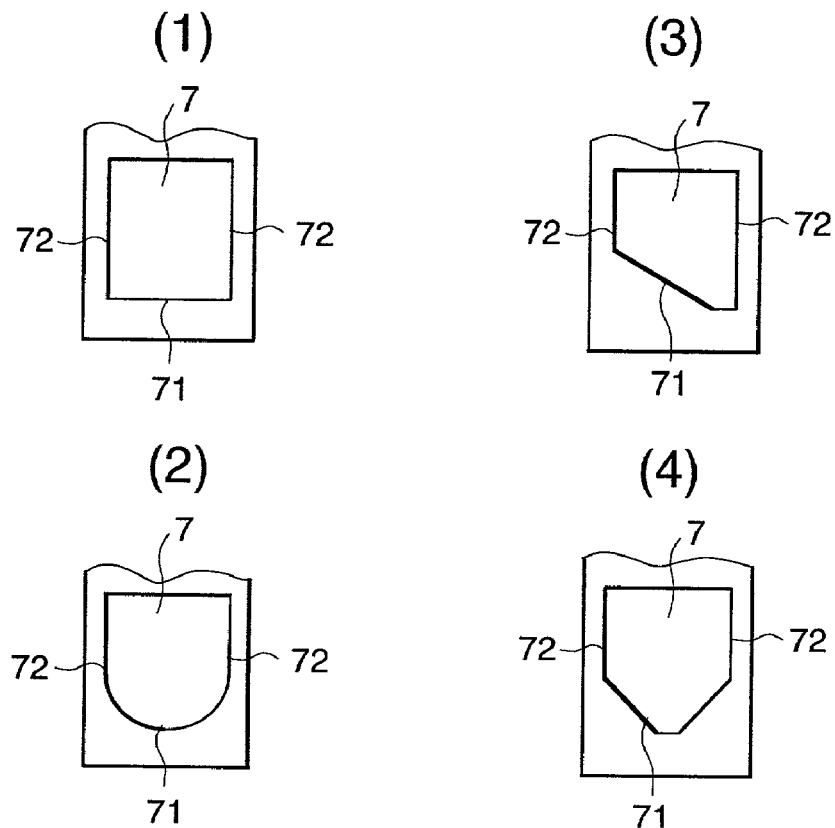
FIG. 3 (parts (1) through (4)) illustrates cross-sectional views of the sub-passages in the structures shown in FIGS. 1 and 2.

Referring now to drawings, FIG. 1 illustrates a cross-sectional view of an air flow measuring device of the present invention. The air flow measuring device is preferably a heating resistor type. In an air intake passage 1 of an automobile internal combustion engine, a module housing 2 for a heating resistor type air flow measuring device is installed through a module flange 5. A sub-passage 7 is formed at the end of the module housing 2 and a flow measuring element 3 is installed inside the sub-passage 7. The flow measuring element 3 is electrically connected with an electronic circuit 4 installed in the module housing 2 and the electronic circuit 4 is electrically connected with the outside through a connector 6. The sub-passage 7 contains a sub-passage inlet 9 whose opening face is perpendicular to the air flow into the air intake passage 1 and a sub-passage outlet 10 whose opening face is parallel to the air flow into the air intake passage 1. In other words, the direction of the air flow is inline with the inlet 9 and the air flow exits outlet 10 in a direction which is perpendicular to the entering air flow. Sub-passage 7 has a semi-circular bottom bend 8 with a predefined curved surface and the flow measuring element 3 is located on the downstream side of the bend of the sub-passage 7. Bottom bend 8 has a maximum downstream point 8a (shown in FIG. 1) at or near the apex of the curvature. Hence, air flow enters inlet 9 and travels in a direction upstream 8b (shown in FIG. 1) to the maximum downstream point 8a and travels in a direction downstream 8c (shown in FIG. 1) toward outlet 10. Hence, dust particles or other foreign matter which has entered sub-passage 7 travels along the outer wall surface 71 (as shown in FIG. 3) at the sub-passage bottom bend 8 by inertial force based on the velocity and weight of the dust particle or foreign matter. Thus, the dust particles or other foreign matter does not interfere with the flow measuring element 3 located around the maximum downstream point 8a of the sub-passage bottom bend 8 and is discharged to the air intake passage 1 through the sub-passage outlet 10.

Figure 2:
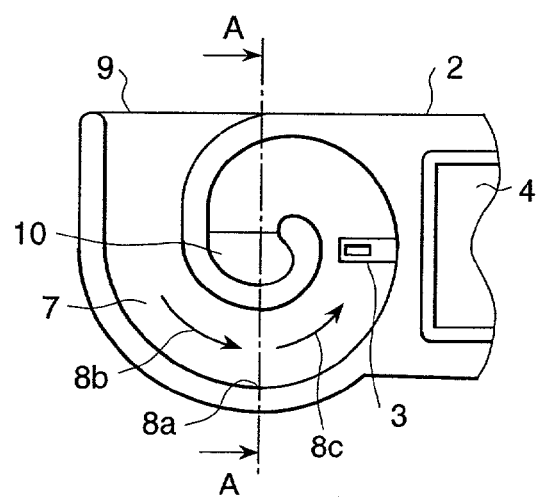
FIG. 2 illustrates a cross-sectional view of a sub-passage according to one embodiment of the present invention.

FIG. 2 is a cross-sectional view of a sub-passage structure in another embodiment of the present invention. Sub-passage 7 has a predefined curvature which continues to curve to outlet 10 beyond the flow measuring element 3. In other words, the flow measuring element 3 is located in a direction downstream 8c from the maximum downstream point 8a as described in FIG. 1. The opening face of the sub-passage inlet 9 is perpendicular to the air flow into the air intake passage 1 and the sub-passage outlet 10 has its opening face in a plane parallel to the direction of the air flow. Hence, dust particles or other foreign matter which has entered the sub-passage 7 goes along the outer wall 71 (as shown in FIG. 3) of the sub-passage 7 by inertial force based on its own velocity and weight. In this way, it does not collide against the flow measuring element 3 located in a direction downstream 8c from the maximum downstream point 8a of the sub-passage and is discharged into the air intake passage 1 through the sub-passage outlet 10. In this embodiment, the sub-passage 7 is continuously curved to the outlet 10 so that vortex formation which may occur on the downstream side of the inner wall area of the sub-passage bend can be effectively suppressed, allowing the heating resistor type air flow measuring element 3 to provide a stable output with less noise. Also, in this structure, the position of the sub-passage outlet 10 can be altered without changing the size of the entire sub-passage, which means that the relative distance between the sub-passage inlet 9 and the sub-passage outlet 10 can be changed. The relative distance between the sub-passage inlet 9 and outlet 10 is an important factor that determines the effect of inertia given throughout the sub-passage 7. By changing the distance freely, the effect of the air flow in the air flow measuring device can be more easily controlled.

Figure 4:
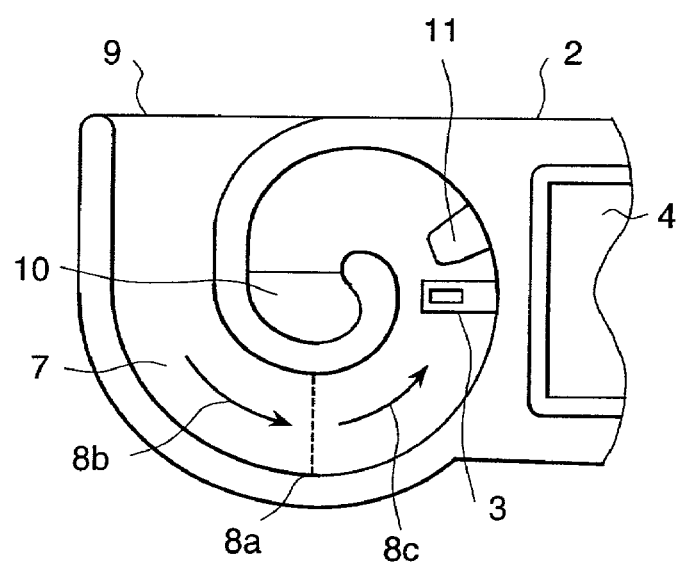
FIG. 4 illustrates a cross-sectional view of a modified version of the sub-passage structure shown in FIG. 2.

FIGS. 3-1 through 3-4 illustrate cross-sectional views of the sub-passage 7 shown in FIGS. 1 and 2, in particular, cross-section "A—A" of FIG. 2. In FIG. 3-1, foreign matter that has entered the sub-passage 7 collides against the outer wall surface 71 of the sub-passage 7. In this example, the outer wall surface 71 is completely flat and the foreign matter which has collided against the wall surface 71 may rebound toward the center of the sub-passage 7 again. In other words, outer wall 71 does not provide a means for guiding and gathering the dust particles or foreign matter. Rather, foreign matter repeatedly rebounds and collides against outer wall 71 while gradually moving along the outer wall surface 71 of the sub-passage 7 to outlet 10. In contrast, the outer wall surface 71 of FIGS. 3-2 through 3-4 are grooved to effectively gather and guide foreign matter to outlet 10. FIG. 3-2 shows an example in which the outer wall surface 71 of the sub-passage is grooved to be semicircular. FIG. 3—3 shows an example in which one side of a junction between the sub-passage outer wall surface 71 and the sub-passage side wall surfaces 72 is grooved. FIG. 3-4 shows an example where both sides of the junction between the sub-passage outer wall surface 71 and the sub-passage side wall surfaces 72 are grooved. In all these structures, based on the angle of the walls 71, 72, dust or other foreign matter that has collided against the sub-passage outer wall surfaces 71, 72 rebounds toward the groove of the sub-passage 7, which permits the foreign matter to be more effectively gathered and guided toward the sub-passage outlet 10. Also, the groove allows dust particles or other foreign matter collected in the outer wall surface 71 to be effectively discharged through the air vent 11 into the air intake passage 1 without interfering with the flow measuring element 3 which is located, at least above the groove, which reduces the deterioration, break-down or other damage to the flow measuring element 3.

FIG. 4 illustrates a cross-sectional view of a modified version of the sub-passage structure as shown in FIG. 2. Here, an air vent 11 with an opening surface area of less than about fifty percent of the opening surface area of the sub-passage outlet 10 is provided on the sub-passage side wall surface 72, downstream 8c from the flow measuring element 3. By regulating the opening of the air vent 11, the inertial effect of the sub-passage 7 can be effectively controlled. Another advantage of this structure is air vent 11 allows any water trapped in sub-passage 7 to be effectively forced out of it, even if the air in it is still.

Figure 5:
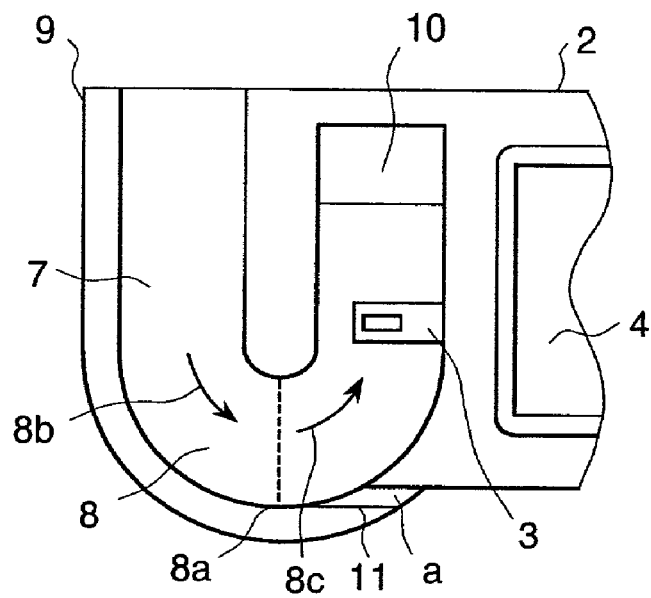
FIG. 5 illustrates a cross-sectional view of a modified version of the sub-passage structure shown in FIG. 1.
Figure 6:
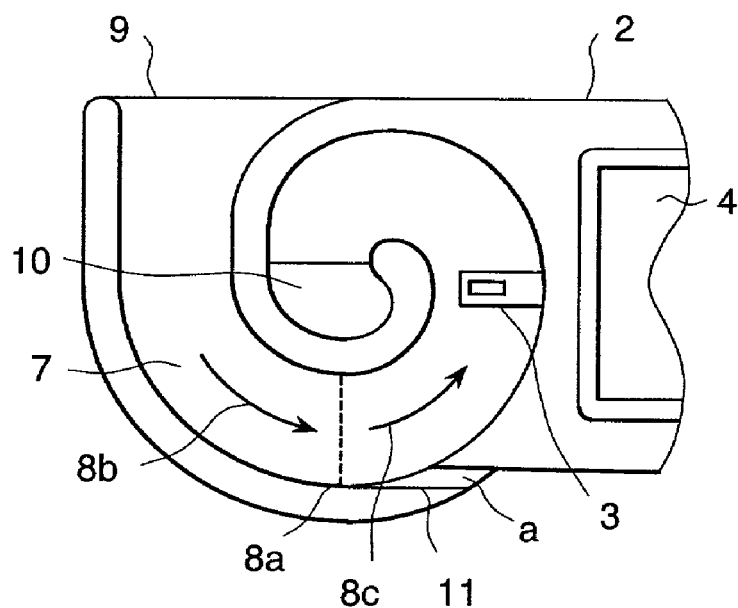
FIG. 6 illustrates a cross-sectional view of a modified version of the sub-passage structure shown in FIG. 2.

FIGS. 5 and 6 are cross-sectional views of another embodiment of the sub-passage structures as shown in FIGS. 1 and 2, respectively. In both structures, an air vent 11 with a height "a" of about 1 mm is provided in a direction upstream 8b from the flow measuring element 3 in sub-passage 7. In these structures, when the ratio of the opening surface area of the air vent 11 to that of the sectional surface area (at its widest point) of subpassage 7 is less than 1:10, it is possible to effectively discharge foreign matter as mentioned above, without impairing the performance of the sub-passage 7. Further, an air vent 11 of this embodiment is effective in eliminating moisture which may collect inside the sub-passage 7.

Figure 7:
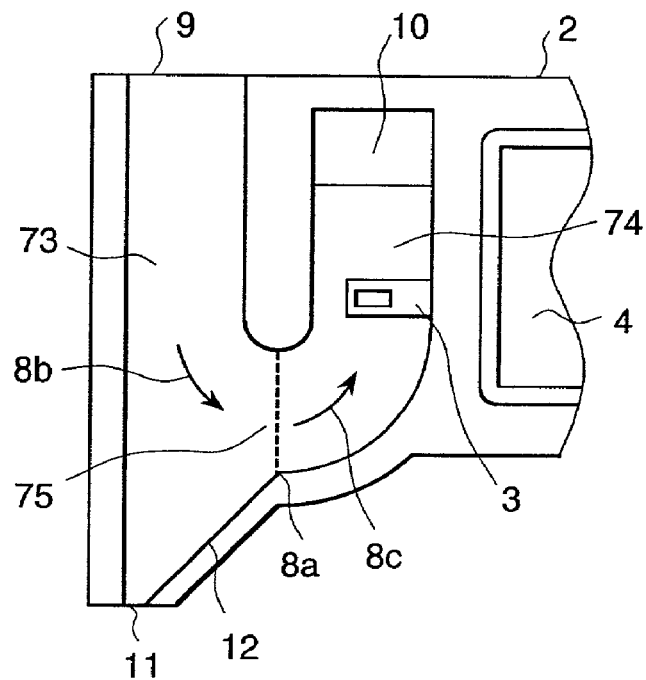
FIG. 7 illustrates a cross-sectional view of a modified version of the sub-passage structure shown in FIG. 1.

FIG. 7 illustrates a cross-sectional view of a modified version of the sub-passage structure as shown in FIG. 1. The sub-passage 7 has a sub-passage inlet 9 with an opening face which is perpendicular to the air flow in the air intake passage 1 and a sub-passage outlet 10 with an opening face parallel to the air flow in the air intake passage 1. Sub-passage 7 has a semi-circular bottom bend with a predefined curved sufface and the flow measuring element 3 is located on the downstream side of the bend of the sub-passage 7. Bottom bend 8 has a maximum downstream point 8a (shown in FIG. 1) at or near the apex of the curvature. Hence, air flow enters inlet 9 and travels in a direction upstream 8b (shown in FIG. 1) to the maximum downstream point 8a and travels in a direction downstream 8c (shown in FIG. 1) toward outlet 10. Hence, since dust particles or other foreign matter which has entered sub-passage 7 travels along the outer wall surface 71 (as shown in FIG. 3) at the sub-passage bottom bend 8 by inertial force based on the velocity and weight of the dust particle or foreign matte, it does not interfere with the flow measuring element 3 located downstream from the maximum downstream point 8a of the sub-passage bottom bend 8 and is discharged to the air intake passage 1 through the sub-passage outlet 10.

In sub-passage 7, at a location at least upstream from the maximum downstream point 8a, there is a first vertical path bottom inclination 12 with a given angle from the plane of air flow from the sub-passage inlet 9. Preferably, an air vent 11 is provided at the base of the inclination 12. In this embodiment, dust particles or other foreign matter which has entered the sub-passage 7 will tend to go straight down the first vertical path 73 by its own weight and velocity toward the first vertical path bottom inclination 12. Also, the dust particles or other foreign matter exits sub-passage 7 by air vent 11. Therefore, air flow, free of debris or moisture can flow in the first horizontal path 75, then downstream towards the second vertical path 74 and exits at outlet 10.

Figure 8:
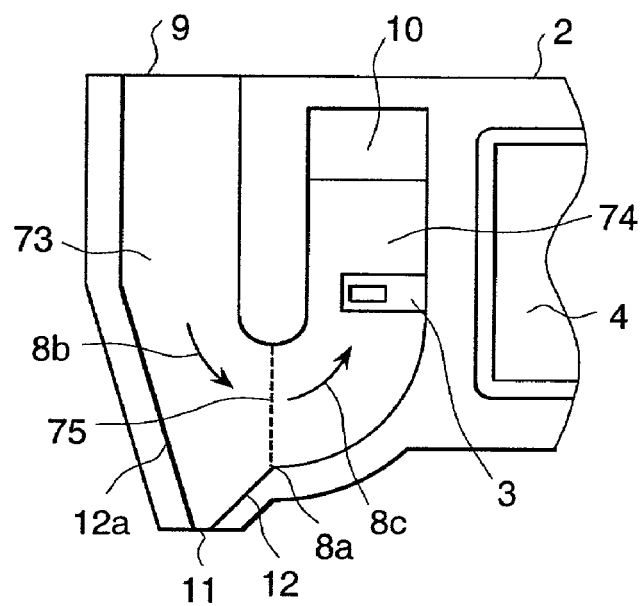
FIG. 8 illustrates a cross-sectional view of a modified version of the sub-passage structure shown in FIG. 1.

FIG. 8 illustrates a cross-sectional view of a modified version of the sub-passage structure as shown in FIG. 1. Here, a second vertical path bottom inclination 12a (shown in FIG. 8) is provided opposite to that of the first inclination 12. The second inclination 12a is also provided upstream from the maximum downstream point 8a. This design is suited to sub-passages which have a first vertical path 73, smaller than the one described in FIG. 7.

Figure 9:
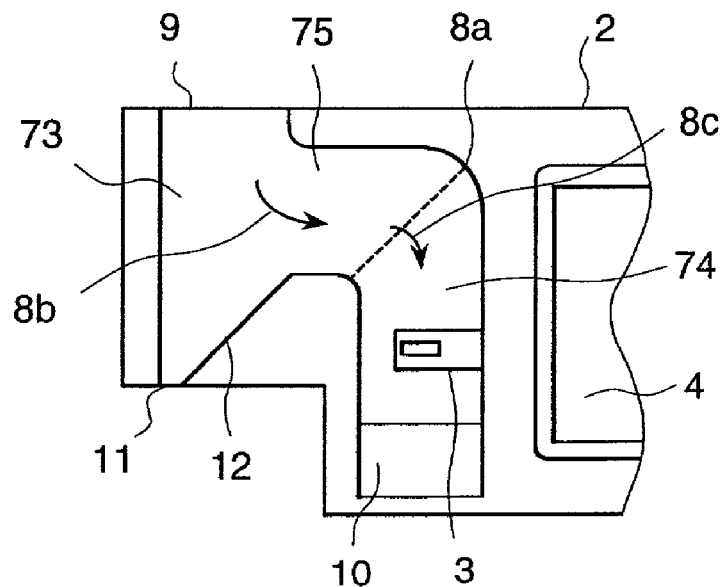
FIG. 9 illustrates a cross-sectional view of a modified version of the sub-passage structure shown in FIG. 1.
Figure 10:
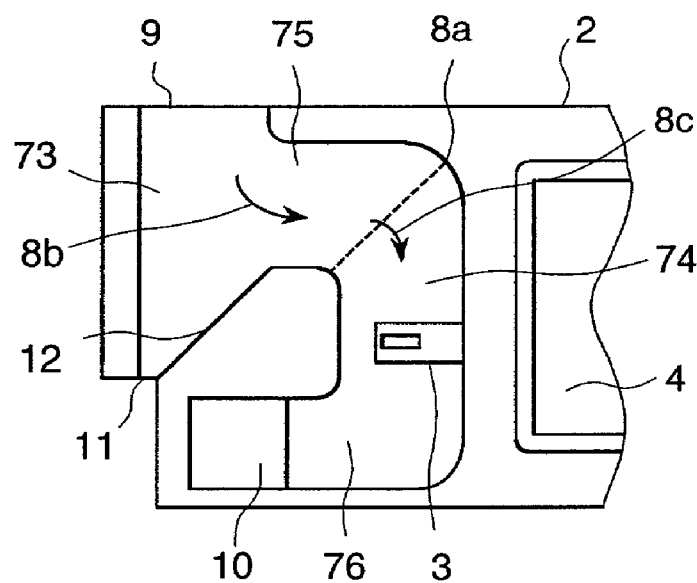
FIG. 10 illustrates a cross-sectional view of a modified version of the sub-passage structure shown in FIG. 1.

FIGS. 9 and 10 show other embodiments, as modified versions of the embodiment shown in FIG. 7. Note, in both these embodiments, the air flow measuring element 3 is also provided downstream from the maximum downstream point 8a (shown in FIG. 7). Also, in the embodiment as described in FIG. 10, a second horizontal path 76 is shown. These embodiments produce substantially the same effect on dust particles and other foreign matter entering the sub-passage 7 as the one described in FIG. 7.

Figure 11:
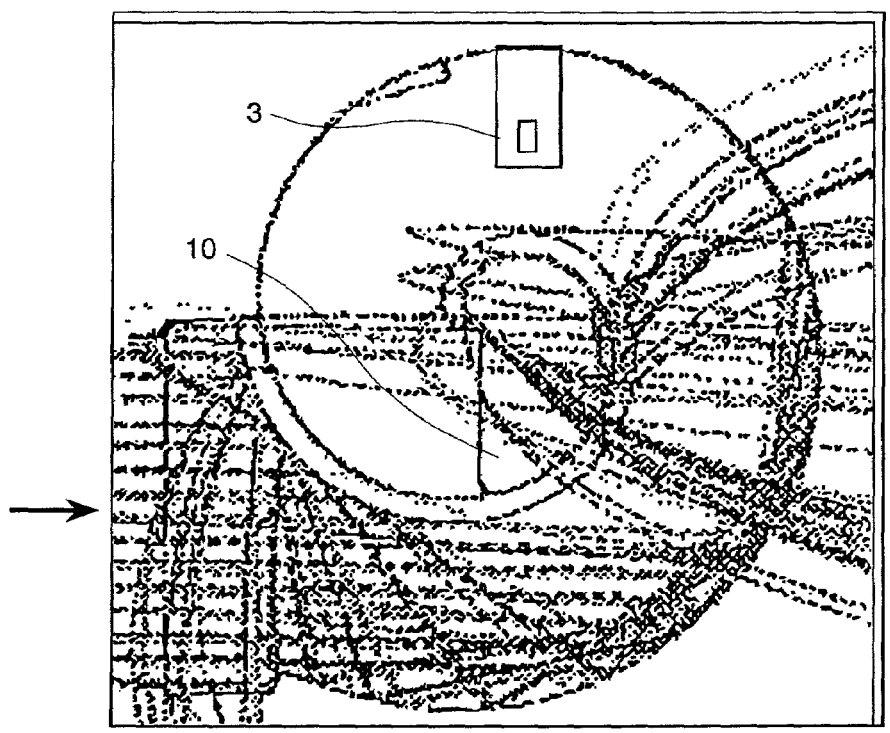
FIG. 11 illustrates the result of a CAE calculation utilizing the air flow measuring device of the present invention.

FIG. 11 illustrates the result of Computer Aided Engineering (CAE) calculation which was carried out utilizing the air flow measuring device of the present invention. Here, the solid lines represent passage wall surfaces and the dotted lines represent tracks of dust particles or foreign matter in the air. The figure demonstrates that dust coming in through the sub-passage inlet 9 collides against the outer wall surface 71 of the sub-passage 7 and rebounds from it repeatedly, while gradually moving along the outer wall surface 71. In other words, dust particles or foreign matter is concentrated and guided near the outer wall surface 71 and exits outlet 10 with little influence on the measuring element 3.

Figure 12:
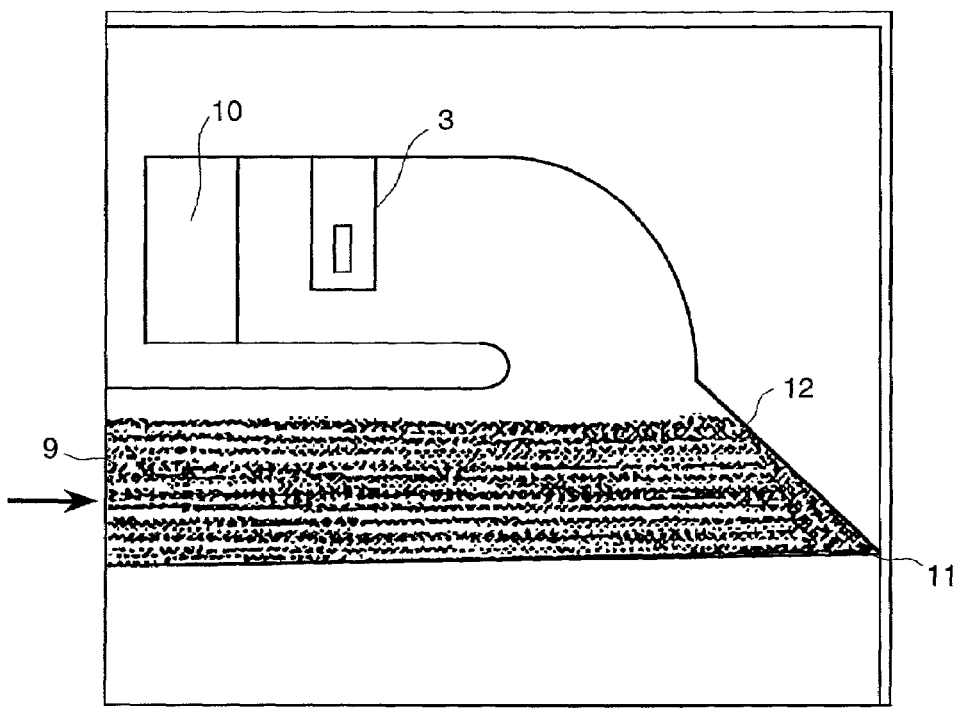
FIG. 12 illustrates the result of another CAE calculation utilizing the air flow measuring device of the present invention.

FIG. 12 illustrates the result of another CAE of another embodiment of the present invention. Here, the solid lines represent passage wall surfaces and the dotted lines represent tracks of dust in the air. Dust coming in through the sub-passage inlet 9 goes straight and collides against the first vertical path bottom inclination 12. Then the dust rebounds toward the air vent 11 due to the inclination angle and is forced out of the sub-passage 7. In other words, dust particles or foreign matter is concentrated and guided near the outer wall surface 71 and exits air vent 11 with little influence on the measuring element 3 while the air flow exits outlet 10.

Hence, the present invention provides an air flow measuring device comprising a housing with a sub-passage having a inlet and a outlet for air flow formed in the housing. The sub-passage has a predefined curvature with a maximum downstream point. Also, a flow measuring element is located in the sub-passage at a position at least further downstream from the point.

Figure 13:
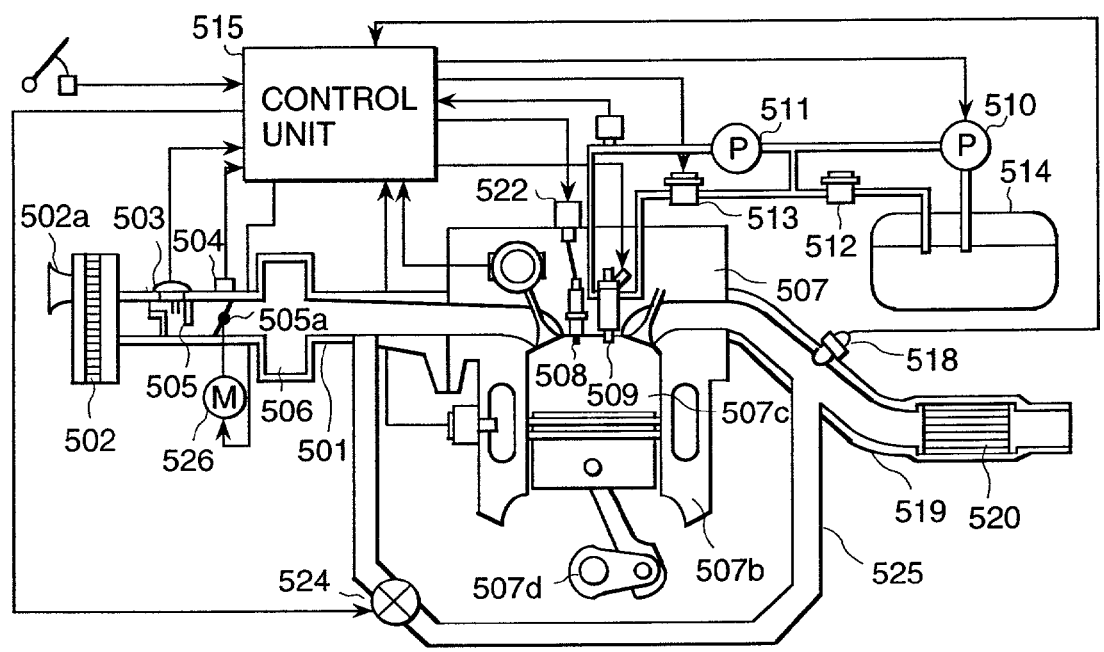
FIG. 13 illustrates a internal combustion engine of utilizing the air flow measuring device of the present invention.

FIG. 13 illustrates an example of an internal combustion engine 507 utilizing the air flow measuring device as described in FIGS. 1–12 of the present invention. Although a specific engine type is described, the present invention can be utilized in any internal combustion engine. Air introduced into a combustion chamber 507c of the engine 507 is a combination of an air intake and EGR gas, wherein the air intake is let in by way of an inlet part 502a of an air cleaner 502 and passes through an air flow measuring device 503 of the present invention, which is one of the means for measuring the operating state of the engine 507. The air further passes through a throttle body 505 in which an electrically controlled throttle valve 505a for controlling the air intake flow quantity is housed. The electrically controlled throttle valve 505a is driven by an electrically controlled throttle motor 526. Next, the air enters a collector 506. From the air flow sensor 503, a signal representing the air intake flow quantity is outputted to a control unit 515, for example, a engine control unit.

A throttle sensor 504, which detects the aperture of the electrically controlled throttle valve for measuring the operating state of the engine, is fitted to the throttle body 505 and its signal is also outputted to the control unit 515. Between an air intake pipe 501 and an exhaust pipe 519, a bypass pipe 525 is provided to constitute bypass piping for recirculating exhaust gas and bypass pipe 525 is provided with an electrically controlled type EGR valve 524, for controlling the recirculating flow quantity of exhaust gas. The air suctioned into the collector 506, after being distributed to air intake pipes 501, each connected to one or another of cylinders 507b of the engine 507, joins EGR gas and is guided to a combustion chamber 507c in each cylinder 507b.

Fuel, such as gasoline, from a fuel tank 514 undergoes primary pressurization by a fuel pump 510, then undergoes secondary pressurization by another fuel pump 511 to a higher pressure while being regulated by a fuel pressure regulator 512 to a constant pressure. The fuel is subjected to another constant pressure by another fuel pressure regulator 513 and injected from injectors 509, one of which is provided for in each cylinder, into combustion chambers 507c. Fuel injected into combustion chambers 507c is raised in voltage by ignition coils 522 and ignited by ignition plugs 508 in response to an ignition signal.

Additionally, a crank angle sensor fitted to a crankshaft 507d of the engine 507 outputs an angle signal POS for detecting a revolution signal, indicating the rotational position of the crankshaft 507d, to the control unit 515. A catalytic converter 520 is provided midway on each exhaust pipe 519 and an A/F sensor 518 provided upstream from the catalytic converter 520 detects the contents of exhausted gas, the resultant detection signal being outputted to the control unit 515.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. An air flow measuring device comprising:
   a module housing supported cantilever-like in an area where air flow is to be measured, wherein said module housing further comprises:
   at least one electrical circuit incorporated in a portion thereof;
   a sub-passage through which at least a part of the air flow to be measured is introduced, said sub-passage having an inlet and an outlet, wherein said sub-passage has a curved portion that deflects part of the air flow; and
   a flow measuring element located downstream of the curved portion as viewed in the part of the air flow introduced in the sub-passage, with the location of said flow measuring element relative to said curved portion being such that particles in said air flow do not interfere with said flow measuring element, and wherein said flow measuring element is electrically connected to the portion of the module housing where the electrical circuit is incorporated, and, wherein the inlet of the sub-passage is located upstream of the flow measuring element in view of the air-flow, wherein a part of the air-flow is led by the curved portion to the portion of the module housing where the electrical circuit is incorporated.

2. A device as set forth in claim 1, further comprising an air vent located downstream from said flow measuring element, wherein said air vent has an opening surface area of less than about fifty percent of an opening surface area of said sub-passage outlet.

3. A device as set forth in claim 1, further comprising an air vent located upstream from said flow measuring element.

4. A device as set forth in claim 3, wherein a ratio between an opening surface area of the said air vent and a sectional surface area of said sub-passage is less than about 1:10.

5. A device as set forth in claim 1, wherein said sub-passage has an outer wall, wherein said outer wall comprises at least one groove such that foreign matter in the air flow does not interfere with said flow measuring element.

6. A device as set forth in claim 1, wherein an inclined surface and an air vent are provided in the curved portion approximately perpendicular to the inlet of the sub-passage.

7. An air flow measuring device comprising:
a module housing defining a sub-passage through which a part of an air flow to be measured is introduced, said sub-passage having an inlet and an outlet;
said sub-passage having a curved part, the air flow being deflected by the curved part, and
a flow measuring element located downstream of the curved part in the sub-passage in view of the part of the air flow to be measured, wherein said curved part has a surface part to which inertia is applied by the part of the air flow to be measured and which is smoothly extended to the outlet thereof.

8. A device as set forth in claim 7, wherein a grooved surface part is located on an outer peripheral surface side of the sub-passage in the curved part.

9. A device as set forth in claim 8, further comprising an air vent downstream of the flow measuring element, said air vent having an opening surface area of less than about fifty percent of an opening surface area of said sub-passage outlet.

10. A device as set forth in claim 7, wherein said sub-passage has an outer wall, wherein said outer wall comprises at least one groove such that foreign matter in the air flow does not interfere with said flow measuring element.

11. A device as set forth in claim 7, wherein an inclined surface and an air vent are provided in the curved part approximately perpendicular to the inlet of the sub-passage.

12. An air-flow measuring device comprising:
a module housing supported in a main passage through which fluid to be measured flows;
a sub-passage defined in the module housing and having an inlet and an outlet, for passing therethrough a part of the fluid to be measured, having a curved part in an intermediate portion of the sub-passage;
a measuring element provided in the sub-passage between the outlet and the curved part, and
an electric circuit incorporated in the module housing, and electronically connected to the measuring element,
wherein a part of the module housing is inserted and cantilever-like supported in the main passage through which the fluid to be measured flows, so as to arrange the sub-passage and the electric circuit in the main passage, the inlet is located nearer to the distal end of the inserted part of the module housing as viewed in the direction of insertion of the module housing, than the measuring element, and the fluid having passed through the inlet is led to the proximal end part of the inserted part of the module housing by the curved part.

13. A device as set forth in claim 12, further comprising an air vent located upstream from the flow measuring element.

14. A device as set forth in claim 13, wherein a ratio between an opening surface area of said air vent and a sectional surface area of the sub-passage is less than about 1:10.

* * * * *